Patented July 23, 1929.

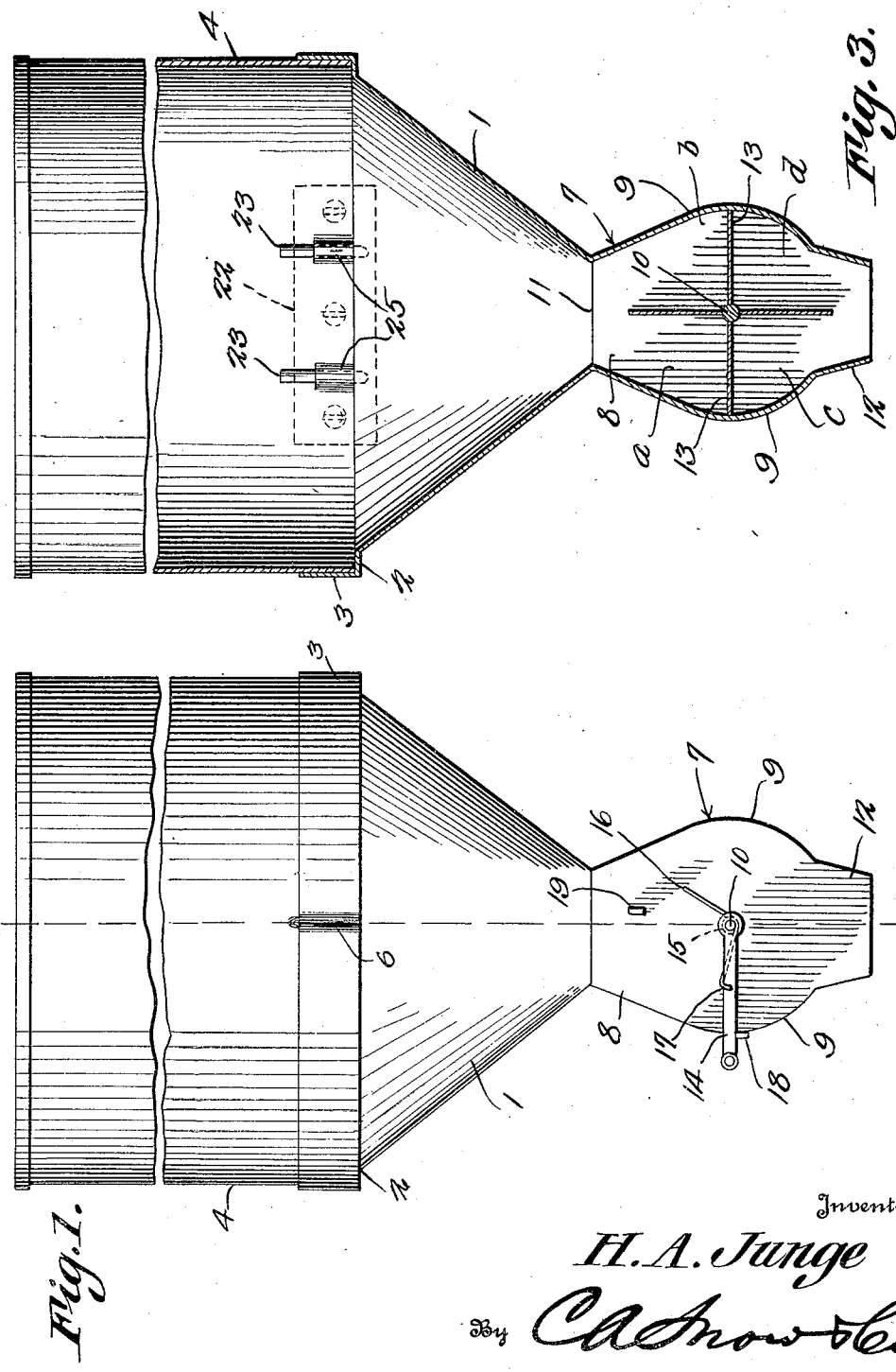

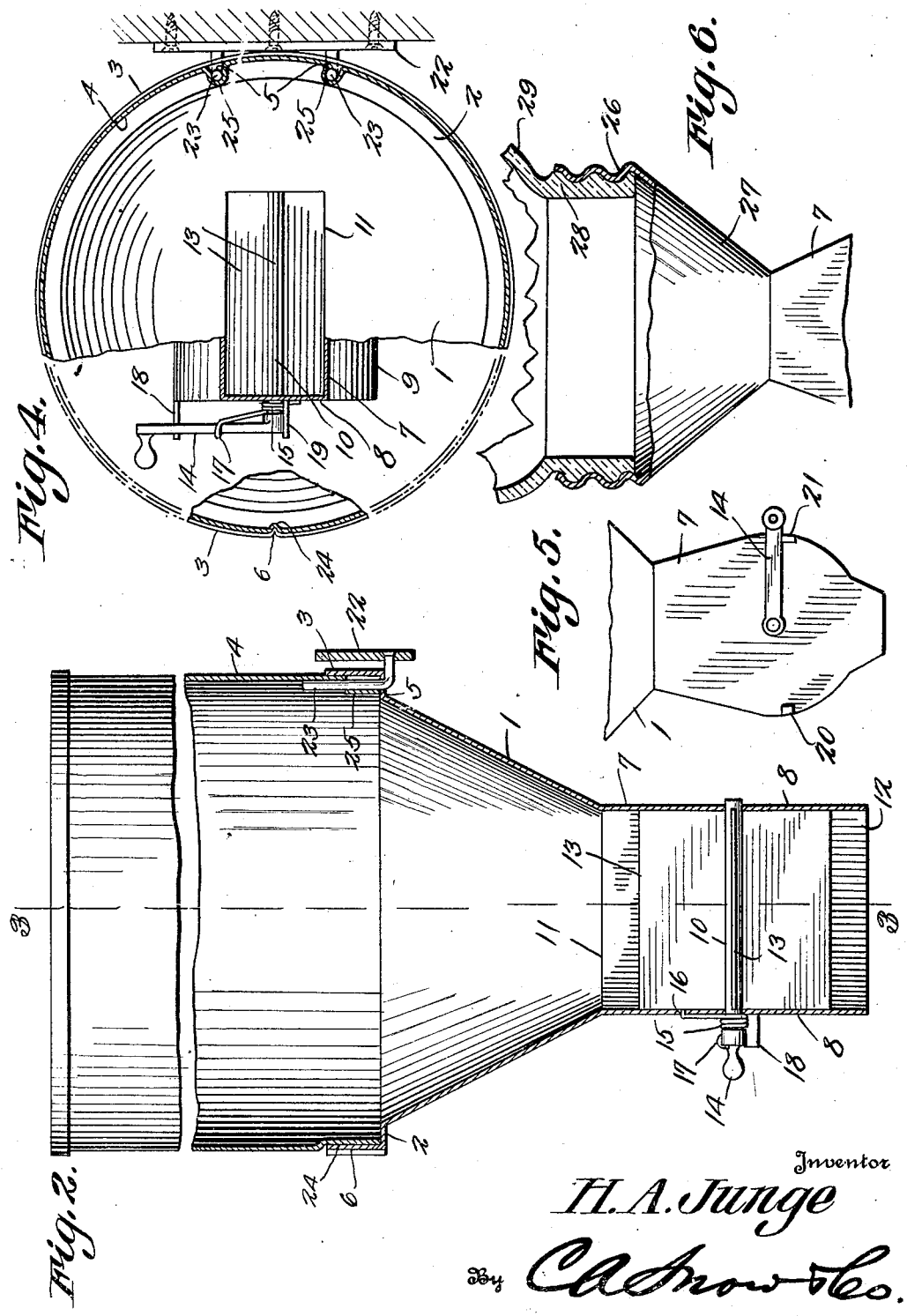

1,721,866

UNITED STATES PATENT OFFICE.

HENRY A. JUNGE, OF GRANTWOOD, NEW JERSEY.

MEASURING AND DISPENSING DEVICE.

Application filed June 21, 1927. Serial No. 200,447.

This invention relates to a device designed primarily for domestic use whereby finely comminuted materials, and more especially coffee, can be measured out and dispensed so as to insure proper proportions of coffee or the like and water or other liquid for the purpose of obtaining the most satisfactory results.

Coffee merchants frequently receive complaints about their products which, upon investigation, have been found to result from improper proportioning of the ingredients rather than inferiority of the product sold. For the purpose of obtaining the most desirable results it is essential that a certain amount of coffee, for example, be used with each cupful of water and any slight deviation from the correct amount frequently results in a beverage which does not meet the standard required. As a general rule coffee is measured out by the tablespoonful and where directions require that one tablespoonful be used with every cupful of water it frequently happens that at one time an even tablespoonful of coffee will be used while at other times a rounded tablespoonful or a heaping tablespoonful will be used. Consequently the resultant beverage will not always have the same taste even though prepared from the same stock. For the purpose of avoiding complaints which are frequently due to incorrect measuring of the product, it is an object of the present invention to provide a simple, durable and efficient measuring device which can be set up readily in a kitchen and to which a container holding coffee or the like can be connected. It is also an object of the invention to provide a device of this character which can be actuated to dispense the bulk material in measured quantities, the dispensed portions being uniform at all times so that the beverage will not vary in strength or flavor.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred forms of the invention have been shown.

In said drawings,

Figure 1 is a side elevation of the device, a container in the form of a can being shown combined therewith, a portion being broken away.

Figure 2 is a section on line 2—2, Figure 1.

Figure 3 is a section on line 3—3, Figure 2.

Figure 4 is a plan view of the dispensing device, portions being broken away.

Figure 5 is a side elevation of a portion of a slightly modified form.

Figure 6 is a view partly in section and partly in elevation showing the device adapted for engagement by a container in the form of a jar.

Referring to the figures by characters of reference 1 designates a hopper-like receiver substantially conical, the upper or large end thereof being formed with an annular shoulder 2 from which is extended a circular flange 3. The flange and shoulder cooperate to provide a seat for the open end of a container 4 in the form of a can, said container being preferably of a special construction as hereinafter explained. Spaced apertures 5 are formed in the shoulder 2 and at a point substantially diametrically opposite these apertures a guide rib 6 is pressed inwardly from the flange 3 and extends from the top to the bottom thereof.

The lower or small end of the receiver 1 opens into the upper end of a casing 7 having flat parallel side walls 8 connected by opposed arcuate walls 9 the lower portions of which are concentric with a shaft 10 journaled in the flat side walls 8. The upper portions of these walls 9 converge upwardly to opposed portions of the outlet 11 of receiver 1. An outlet spout 12 is extended downwardly from the bottom of the casing 7, and radiating from the shaft 10 are blades 13. Preferably four of these blades are used, the same being spaced apart equal distances so as to provide pockets indicated at $a$, $b$, $c$, and $d$. These blades, which are necessarily angular, are adapted to lightly engage the inner surface of the arcuate portion of each wall 9 and they also extend close to the flat side walls 8.

A handle 14 is arranged outside of the casing 7 and secured to shaft 10. In the structure illustrated in Figures 1 to 4 inclusive a spring 15 is coiled about one end of the shaft 10 and has one end anchored to the casing 7 as shown at 16 while the other end straddles and thrusts against the handle 14 as shown at 17. Thus the handle is normally pressed yieldingly against a stop lug 18 at which time two of the blades 13 are extended straight across the casing 7 as shown in Figure 3 while the remaining blades 13 are extended substantially vertically.

With the parts thus located it will be noted that bulk material supplied to the receiving portion 1 will gravitate into the two pockets *a* and *b*. Thus when the handle 14 is swung away from the stop 18 against the action of spring 15 the blades will be rotated with the shaft 10 and as the upper blade 13 gradually comes against the inner surface of the arcuate portion of one of the walls 9, a measured quantity of the bulk material will be trapped between two of the blades and said wall and subsequently be delivered downwardly through the spout 12. With the parts positioned as shown in Figures 1 and 3 the contents of the pocket *b* would be brought to the position indicated by pocket *d* while at the same time pocket *c* would be brought to the position indicated by pocket *a*. Thus while the contents of pocket *b* are being delivered, pocket *c* is being filled by the gravitation of bulk material. While the blades are in these positions the handle 14 can be held against a stop 19. After the delivery of the contents of pocket *b* the handle 14 can be released whereupon the parts will return automatically to the positions shown in Figures 1 and 2. This will return the pocket *b* to a point where it can be refilled while the contents of pocket *c* will be delivered to the spout 12. Each pocket can be so proportioned as to hold a predetermined quantity of bulk material. For example each pocket can hold one-half tablespoonful of coffee so that each movement of the handle away from and back to normal position will deliver two one-half tablespoonfuls of coffee. However, if preferred, each pocket can be proportioned to hold a greater amount as, for example, a tablespoonful.

Instead of moving the handle through a one-quarter circle during the dispensing of the bulk material the same can be moved through a one-half circle against either of two diametrically opposed stops 20 and 21 as shown in Figure 5. In this modified structure the handle can be moved to and retained at either extreme positon as the spring, shown at 15 in Figure 1, need not be used.

The dispensing device can be connected to a wall or other structure by using a simple form of supporting member such as shown, for example, in Figures 2, 3 and 4, this member being in the form of a bracket including an attaching plate 22 having angular hooks 23 projecting laterally therefrom. These hooks are so spaced as to enter the spaced openings in the shoulder 2.

The container 4 which is preferably in the form of a can in which the bulk material is sold, may be specially shaped for use in connection with the dispensing device. For example, a short longitudinal groove 24 can be pressed thereinto at one end while spaced channels 25 can also be pressed thereinto at the same end. Groove 24 and the channels 25 are so located relative to each other that when the rib 6 is inserted into groove 24, the channels 25 will register with the openings 5. The length of the groove 24 and channels 25 is such that the removable cover (not shown) provided for the container will conceal the same.

In using the device the cover is removed from a can holding the bulk material and the dispensing device is then inverted and placed thereon with the rib 6 seated in groove 24 and the openings 5 registering with channels 25. The open end of the container will fit snugly against the shoulder 2 and against the inner surface of the flange 3. After the parts have thus been assembled the container 4 is inverted with the dispensing device thereunder and said dispensing device is then suspended from the hooks 23 which are inserted into the openings 5 and the channels 25. With the parts thus arranged the device is ready for use, it being understood that the bulk material will gravitate into the receiver 1 and fill the upper pockets *a* and *b* after which measured quantities of the material can be dispensed as heretofore explained. The blades 13 cooperate with the walls of the casing 7 to prevent moisture from entering the dispensing device and as the container 4 and receiver 1 are thus practically sealed the bulk material will not deteriorate.

It is to be understood of course that means other than that described can be used for connecting a container to the dispensing device. For example the flange 26 at the top of the receiver 27 can be screwthreaded as shown in Figure 6 so as to be engaged by the threaded neck 28 of a jar 29 or the like. Obviously other changes in the construction and arrangement of the parts can be made within the scope of the invention as claimed.

By providing the upwardly converging upper portions of the casing walls 9, each blade 13, as it is moved downwardly, will approach the wall of the casing gradually so that none of the bulk material will become lodged between the outer edge of the blade and the wall of the casing and interfere with the proper operation of the device.

What is claimed is:

A dispensing attachment for packaged bulk material including a receiver, means at one end thereof for engaging the open end of a package of bulk material and for engaging a supporting element, said receiver having a reduced lower end portion provided with a bottom outlet, said reduced portion having flat parallel side walls and opposed arcuate walls, a transverse shaft journaled in the flat walls, the lower portions of the arcuate walls being concentric with the shaft, there being opposed flat walls converging upwardly from the arcuate walls, blades radiating from the shaft, means for rotating the shaft to move the blades relative to the converging flat walls and into gradual engagement with the arcuate walls, said blades forming pockets therebetween.

In testimony that I claim the foregoing as my own, I have hereto affixed my signature.

HENRY A. JUNGE.